Oct. 23, 1923.

H. H. GOVE 1,471,789

INTERNAL COMBUSTION ENGINE

Filed May 5, 1920  3 Sheets-Sheet 1

INVENTOR
Henry H. Gove,
By his Atty.
J. H. McCready.

Oct. 23, 1923.  
H. H. GOVE  
1,471,789

INTERNAL COMBUSTION ENGINE

Filed May 5, 1920    3 Sheets-Sheet 2

INVENTOR  
Henry H. Gove,  
By his Attorney,  
J. H. McCready.

Patented Oct. 23, 1923.

1,471,789

UNITED STATES PATENT OFFICE.

HENRY H. GOVE, OF BIDDEFORD, MAINE, ASSIGNOR TO GOVE MOTOR COMPANY, OF BIDDEFORD, MAINE, A CORPORATION OF MAINE.

INTERNAL-COMBUSTION ENGINE.

Application filed May 5, 1920. Serial No. 379,164.

*To all whom it may concern:*

Be it known that I, HENRY H. GOVE, a citizen of the United States, residing at Biddeford, in the county of York and State of Maine, have invented a new and useful Improvement in Internal-Combustion Engines, of which the following description, in connection with the accompanying drawings, is a specification, like reference characters on the drawings indicating like parts in the several figures.

This invention relates to internal combustion engines and is particularly concerned with the rotary valve type of internal combustion engine.

While a great many attempts have been made heretofore to develop an internal combustion engine having rotary valves, none of these attempts, so far as I have been able to learn, have attained commercial success. Among the difficulties encountered with these prior constructions may be mentioned particularly the warping of the rotary valve at the high temperature at which it is required to work, the loss of pressure on the compression and power strokes, lubricating difficulties, and the sticking of the parts due to the accumulation of carbon. At the same time the advantages to be derived from a rotary valve construction as distinguished from poppet and sleeve valve types, are thoroughly recognized by those skilled in this art.

It is the chief object of the present invention to devise a rotary valve type of engine which will overcome these difficulties and will form a thoroughly practical and satisfactory solution for these problems. The nature of the invention will be readily understood from the following description when read in connection with the accompanying drawings, and the novel features will be particularly pointed out in the appended claim.

Referring now to the drawings.

Figure 1:
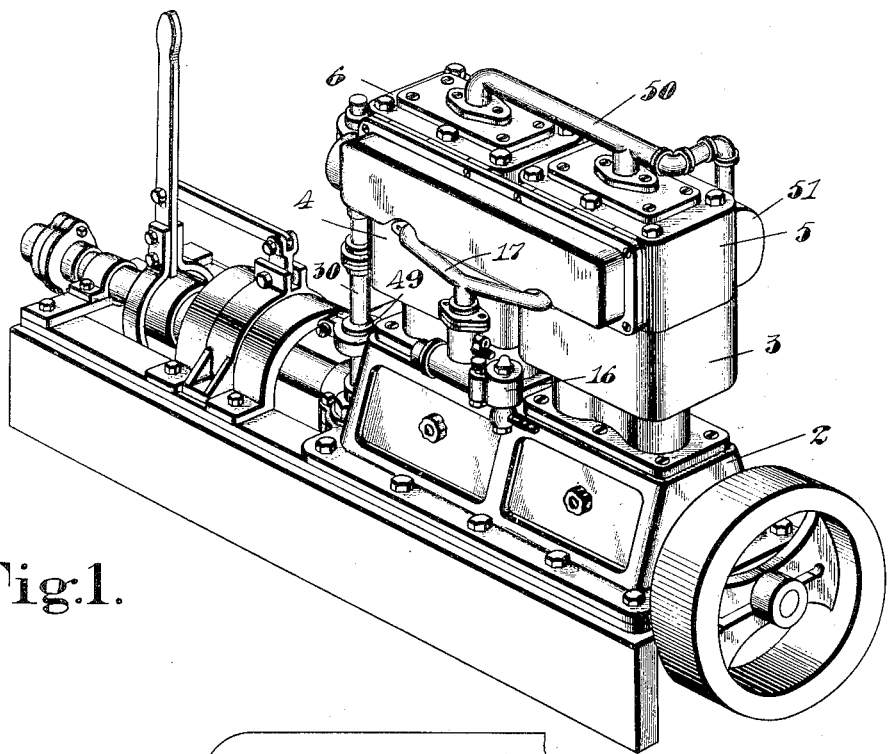
Figure 1 is a perspective view of an engine embodying the present invention.

The drawings show the invention embodied in a four cylinder marine type of engine although it will be understood that the invention can equally as well be embodied in an engine having any other number of cylinders. The engine shown comprises a base 2 supporting two cylinder blocks 3 and 4, each containing a pair of cylinders. These cylinder blocks carry cylinder heads 5 and 6, respectively. The base is provided with suitable bearings to support a crank shaft 7 which is connected by pitman rods 8 to the pistons 9 mounted in the respective cylinder. The construction so far described is not substantially different from that of other engines of this general type, with the exception of certain features of the cylinder head.

Referring now more particularly to the second sheet of drawings, it will be seen that each cylinder is equipped with a rotary valve 10 mounted in a suitable housing 11 in the cylinder head. Each of said valves is located centrally over its respective cylinder. That is, the axis of the cylinder passes substantially through the axis of the valve. Each cylinder is provided with a port or passage 12 leading from the upper end of the cylinder into the chamber in the housing 11, and the valve 10 controls the communication through this port. It will be seen from an inspection of Figs. 6 and 7, that each of the valves 10 is essentially cylindrical in form and that the valves extend transversely to the crank shaft. Each valve is provided with two independent passages formed therethrough. One of these passages, indicated at 14, is the inlet passage, and the other, designated at 15, is the exhaust passage, and it will be seen that while both of these passages open on to the peripheral surface of the valve, they lead in opposite directions, the exhaust passage 15 opening axially at one end of the valve and the inlet passage 14 opening at the opposite end of the valve at one side of the axis of rotation of the valve.

Figure 9:
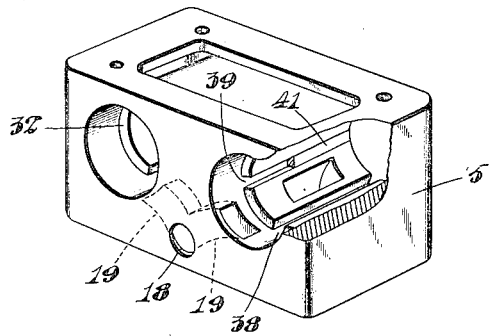
Fig. 9 is an angular view of a cylinder head with certain parts broken away.

The fuel mixture is led from a carburetor 16, Fig. 1, of any suitable form, through an intake manifold 17 to two openings, one in each cylinder head, that in the head 5 being shown at 18, Fig. 9. Diverging passages 19 lead from this opening to the opposite housing chambers in this cylinder head, and each of these passages leads into a passage 20, Figs. 3 and 5, formed in a block 21 that fits over one end of the valve. That is, the end of the valve rotates in contact with the end face of the block 21 thus bringing the passage 14 into communication at a certain point with the passage 20 which leads to the carburetor. The piston is descending at this time and consequently draws a charge into the cylinder.

As above stated, the burnt gases are discharged through the exhaust passage 15 formed in a curved tube or stem in the valve and which terminates in a reduced nipple 22. This nipple fits into an exhaust manifold 24 bolted to one side of the engine.

For the purpose of driving the valves 10, each valve is secured to a short shaft 25 rotatably supported in the block 21, and each shaft has a spiral gear connection 26 with a long horizontal shaft 27 mounted in the series of blocks 21 and lying immediately beside the cylinder heads. This shaft carries a spiral gear meshing with a companion gear 29, Fig. 2, fast on an upright shaft 30 which has a spiral gear connection 31 with the crank shaft 7. All the valves thus are positively connected together so that they must rotate in unison and a definite timed relationship is maintained between them and the crank shaft. The valves rotate once while the crank shaft revolves twice.

Figure 6:
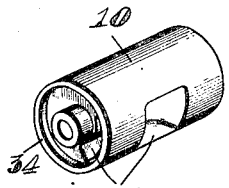
Figs. 6 and 7 are angular views of the rotary valve.
Figure 7:
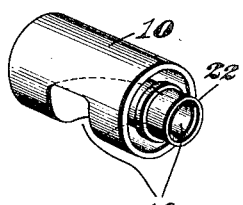
Figure 5:
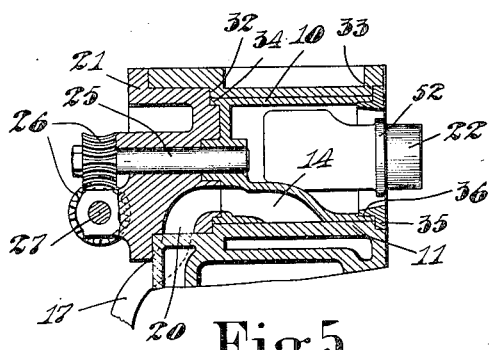
Fig. 5 is a cross-sectional view through the valve mechanism at right angles to Fig. 4.

Each valve 10 has a snug but running fit in its housing, and a novel connection is provided at its ends. Referring particularly to Fig. 5 it will be seen that the valve 10 is of substantially the same length as the housing chamber in which it rotates. At one end of this chamber the housing is provided with a step or peripheral shoulder 32 and at its opposite end with a similar step or shoulder 33. The intake end of the valve is recessed, as best shown in Fig. 6, so that a short sleeve-like extension 34 is formed at its periphery, and the stationary block 21 is stepped to fit the shoulder 32 and also to fit into the interior of the sleeve-like projection 34. The construction at the opposite end of the valve is very much like that just described. That is, a ring 35 is provided at this end with a step or shoulder to fit into the shoulder 33 and also with an annular flange 36 that fits snugly within the sleeve-like end of the valve. This ring is bolted or screwed to the cylinder head and shims are placed between the shoulder 33 and the ring so that a proper fit between this ring and the valve is obtained. Preferably the bearing surface of the circular flange 36 is tapered slightly so that when it is adjusted inwardly to compensate for wear on the end face of the valve it will also compensate for wear on the inner bearing surface of the valve.

It will now be observed that this construction effectually prevents any leakage around the ends of the valve during the compression and power strokes, particularly when it is remembered that the surfaces between the valve 10 and the parts 11, 21 and 35 are supplied with oil so that the leakage which otherwise would occur is prevented by the sealing of the clearance spaces with oil. Both the compression and power strokes occur while the port 12 is closed by the solid peripheral surface of the valve 10. The pressure exerted on the valve tends to force it against the wall of the housing chamber opposite the clearance port and thus tends to force the portions of the sleeve-like extensions at opposite ends of the valve firmly against their bearing surfaces on the parts 21 and 36. The pressure in the cylinders thus is utilized to prevent leakage around the ends of the valve. In other words, this construction seals the valve against leakage that otherwise would take place in an axial direction with reference to the valve.

Figure 4:
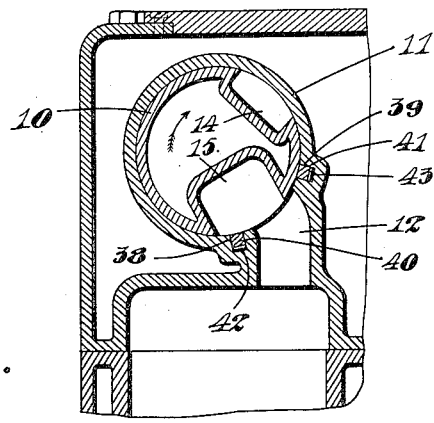
Fig. 4 is a cross-sectional view on a large scale through the valve mechanism.

For the purpose of sealing the valve against circumferential leakage, the housing 11 is provided with two grooves 38 and 39, respectively, Figs. 4 and 9, one in front of and the other behind the port 12, referring to the direction of rotation of the valve. Two compression bars 40 and 41 are mounted, respectively, in these grooves and the bars are backed up by wave springs 42 and 43, respectively, which press the bars constantly against the peripheral surface of the valve 10. These bars thus act in the same manner as the piston rings in a cylinder and they effectually seal the space between the housing and the valve at opposite sides of the port 12.

With regard to the sealing of the valve against leakage on the compression power strokes, it may be stated that the clearance between the valve 10 and the housing 11 preferably is made somewhat greater than the clearance between the valve and the annular bearing flange 36. The latter clearance may be made very small indeed, say approximately one one-thousandth of an inch, or slightly more, while the clearance between the parts 10 and 11 preferably should be approximately three one-thousandths of an inch. This difference is permitted by the fact that the valve expands away from the flange 36 and this arrangement of clearance is of advantage in reducing the leakage around the valve. That is, on the compression or power strokes the pressure in the cylinder tends to force the valve away from the port 12 and against the opposite side of the housing. By adjusting the clearances, as just described, the valve finds a bearing against the flange 36 instead of against the opposite side of the housing. This tightens the joint through which leakage otherwise might occur between the valve and the flange 36. Furthermore, due to the very long leakage surface around the valve there is very little opportunity for pressure to escape in this direction.

Figure 3:
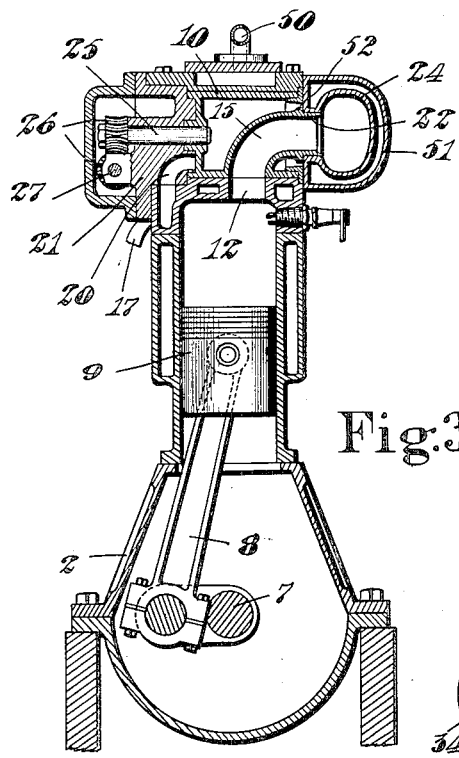
Fig. 3 is a vertical, transverse, cross-sectional view of the engine shown in Figs. 1 and 2.

It will be seen from an inspection of Figs. 3 and 5 that the nipple or end portion 22 of the exhaust tube in the valve is provided with a shoulder 52 which lies closely adjacent to the wall of the exhaust manifold. This shoulder has the advantage of preventing the exhaust from blowing back directly into the chamber surrounding the pipe 15. The nipple 22, however, preferably has a very free fit in the exhaust manifold so that normally it does not touch the manifold at all.

Figure 10:
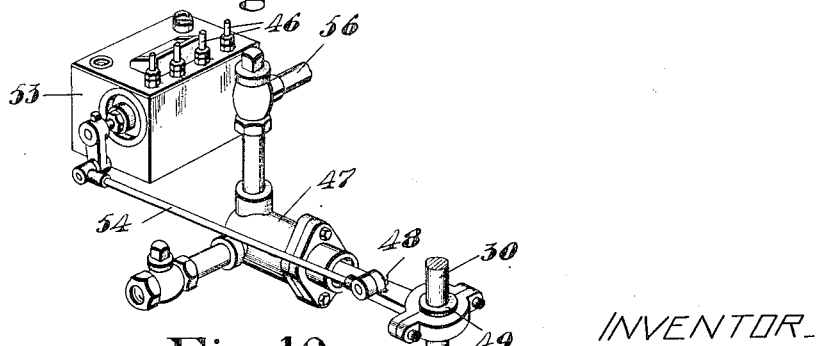
Fig. 10 is an angular view showing another part of the lubricating system.

The engine is provided with suitable water jacketing, as will be seen from an inspection of the drawings, and the cooling water preferably is led from the cylinders through a pipe 50, Fig. 1, to a water jacket 51 around the exhaust manifold. It will be seen that the water jacket surrounds the valve housings, including the parts in which the compression bars are located, so that the valves and their housings are not subjected to as wide a range of temperatures as otherwise would be the case. The water circulation is produced by a pump 47, Fig. 10, operated by a pitman rod 48 which is driven by an eccentric 49 fast on an upright shaft 30, the discharge pipe 56 of this pump being connected with the inlet port of the water jacket.

Figure 8:
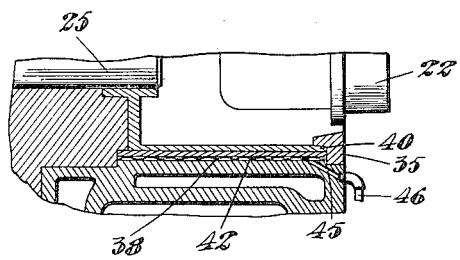
Fig. 8 is a cross-sectional view showing the method of lubricating the valve mechanism.

As shown in Fig. 8, an oil duct 45 is drilled from one side of the cylinder head into the base of the groove 38. Pipe connections 46, Figs. 8 and 10, lead oil under pressure from a force feed oiler 53 to this duct, and similar connections may also be provided, if desired, between the oiler and the groove 39, and to any other parts which it is desired to lubricate by a positive feed. Inasmuch as the groove 38 runs the entire length of the valve it will be seen that the delivery of oil to this groove also results in supplying oil to the bearing surfaces at the opposite ends of the valve. The oiler 53 may be of any suitable type, these force feed oilers being well known, and it may be driven by a link 54 connecting the pitman rod 48 with the crank 55 of the oiler. The particular type of oiler shown is of the ratchet drive type so that the reciprocating motion imparted to the crank 55 is operative to drive the oiler.

Figure 2:
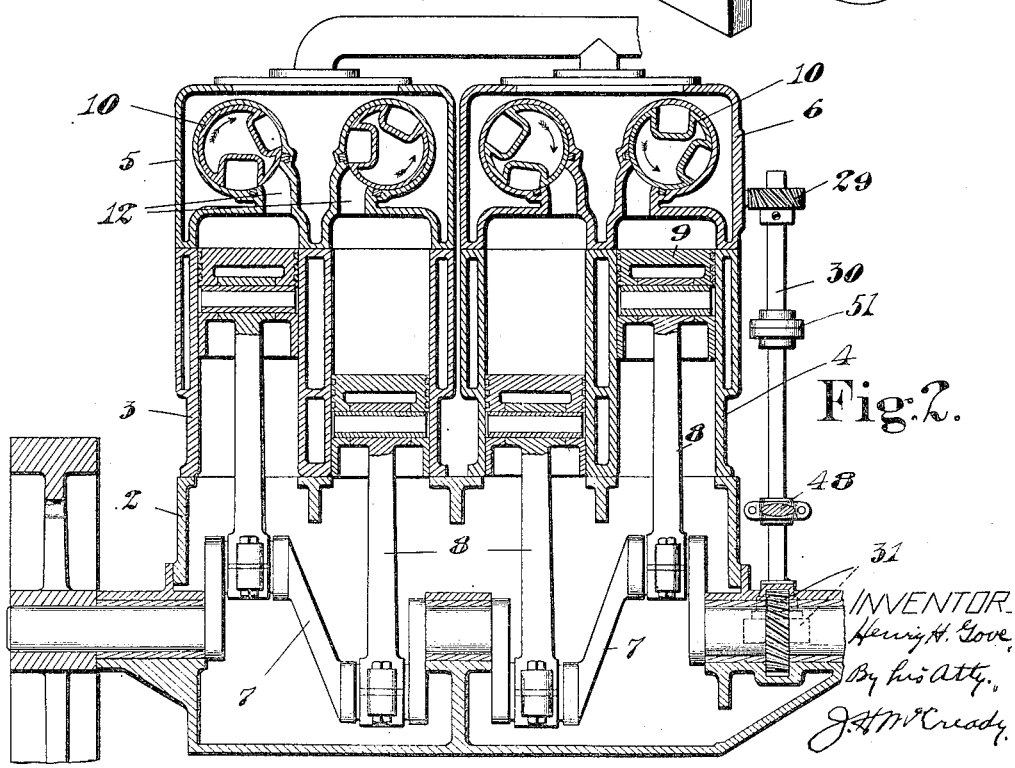
Fig. 2 is a vertical, longitudinal, cross-sectional view of the engine shown in Fig. 1.

It will be seen from an inspection of Figs. 2 and 4 that the ports 12 open into the valve chamber at one side of the center and therefore at one side of the lowest point in this chamber. It will also be observed that the direction of rotation of the valves is such, as indicated by the arrows, that each valve rotates away from its port and toward this lowest point. In other words, the ports open into the chamber at a point behind (with reference to the direction of rotation of the valves) the lowest point in the valve chamber. This arrangement is of advantage in preventing oil from draining into the cylinder by gravity since any direct drainage into the port is prevented by its location, and the direction of rotation of the valve tends to carry the oil away from the port 12 rather than toward it.

It will now be understood that the construction here provided prevents the difficulties experienced with other rotary valve constructions due to warping of the valves since the valves are very short and therefore any tendency to warp is so slight as to be of no consequence. The peculiar stepped construction at the ends of the valve and the arrangement of compression bars prevents the loss of pressure on either the compression or power strokes, and the arrangement is such, as above described, that the internal pressure tends to seat the valve more tightly in its housing. The compression bars 40 and 41 also are of advantage in shearing off the carbon from the peripheral surfaces of the valves and preventing any accumulations that might otherwise tend to make the valves stick. It should further be noted that the connection from the cylinder to the exhaust manifold 24 is very short so that the exhaust gases are expelled quickly. An advantage of the mounting of the valves in the manner shown transversely of the axis of the crank shaft is that any individual valve can be removed without disturbing the others. It will be noted that the shaft 30 is in two parts connected by a coupling 56, Fig. 2, so that whenever it is desired to move the cylinder heads this coupling can be disconnected and the heads taken off without disturbing the timing of the gears.

While I have herein shown and described the best embodiment of the invention of which I am at present aware, it will readily be appreciated by those skilled in this art that this embodiment may be modified in many particulars without departing from the spirit or scope of this invention.

What is claimed as new is:

An internal combustion engine comprising, in combination, an upright cylinder, a piston working in said cylinder, a crank shaft driven by said piston, a rotary valve mounted centrally of said cylinder at the end thereof and extending horizontally in a direction transverse to said shaft, a housing in which said valve rotates, a port leading from the upper end of said cylinder into the chamber in said housing in which said valve rotates and opening into the lower part of said chamber at one side of and behind the lower center thereof with reference to the direction of rotation of the valve, compression bars set into said housing both above and below said port, means for pressing said bars against the peripheral surface of the valve, means for conducting the fuel mixture to one end of said valve, and an exhaust conduit into which the burnt gases are discharged through the other end of said valve.

In testimony whereof I have signed my name to this specification.

HENRY H. GOVE.